(12) United States Patent
Tsutsumi et al.

(10) Patent No.: US 11,938,983 B2
(45) Date of Patent: Mar. 26, 2024

(54) TRAIN POSITION ESTIMATION DEVICE

(71) Applicant: HITACHI, LTD., Tokyo (JP)

(72) Inventors: Yuhi Tsutsumi, Tokyo (JP); Atsushi Oda, Tokyo (JP); Keiichi Katsuta, Tokyo (JP); Kazuo Tokuyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 870 days.

(21) Appl. No.: 16/977,542

(22) PCT Filed: Jan. 28, 2019

(86) PCT No.: PCT/JP2019/002725
§ 371 (c)(1),
(2) Date: Sep. 2, 2020

(87) PCT Pub. No.: WO2019/171821
PCT Pub. Date: Sep. 12, 2019

(65) Prior Publication Data
US 2021/0001902 A1 Jan. 7, 2021

(30) Foreign Application Priority Data
Mar. 5, 2018 (JP) .................. 2018-038176

(51) Int. Cl.
*B61L 25/02* (2006.01)
*G01C 21/30* (2006.01)
(Continued)

(52) U.S. Cl.
CPC .............. *B61L 25/02* (2013.01); *B61L 25/025* (2013.01); *G01C 21/30* (2013.01); *G01S 7/4808* (2013.01); *G01S 17/89* (2013.01); *G01S 17/931* (2020.01)

(58) Field of Classification Search
CPC ........ B61L 25/00; B61L 25/02; B61L 25/021; B61L 25/025; B61L 25/028;
(Continued)

(56) References Cited

U.S. PATENT DOCUMENTS 8,150,658 B2 * 4/2012 Beniyama ........... G06F 16/5854
707/600
9,242,378 B2 * 1/2016 Matsumoto ............ B25J 9/1664
(Continued)

FOREIGN PATENT DOCUMENTS

JP 2004005593 A 1/2004
JP 2008247154 A 10/2008
(Continued)

OTHER PUBLICATIONS

Extended European Search Report dated Nov. 2, 2021, issued in corresponding EP Application No. 19763508.9.
(Continued)

*Primary Examiner* — Zachary L Kuhfuss
*Assistant Examiner* — Cheng Lin
(74) *Attorney, Agent, or Firm* — MATTINGLY & MALUR, PC

(57) ABSTRACT

A train position estimation device which calculates the position of a vehicle traveling on a predetermined path and comprises a surroundings shape measurement unit that is installed in the vehicle and measures the shape of the surroundings of the current location of the vehicle and a map storage unit for storing surroundings shape data at positions measured in advance, the train position estimation device being characterized by comprising a start position estimation unit for storing the probability of presence of the vehicle at each position; a map retrieval section determination device for outputting surroundings shape data for each position in descending order of presence probability; and a matching
(Continued)

processing device that compares the surroundings shape data for the current location with the retrieved surroundings shape data and outputs the position for which the difference therebetween is equal to or less than a predetermined threshold value.

4 Claims, 4 Drawing Sheets

(51) Int. Cl.
*G01S 7/48* (2006.01)
*G01S 17/89* (2020.01)
*G01S 17/931* (2020.01)

(58) Field of Classification Search
CPC ........ G01S 7/4808; G01S 17/88; G01S 17/89; G01S 17/93; G01S 17/931; G01C 21/30; G05D 1/0274
See application file for complete search history.

(56) References Cited

U.S. PATENT DOCUMENTS

| | | | |
|---|---|---|---|
| 10,551,201 B2* | 2/2020 | Yunoki | G08G 1/167 |
| 10,836,381 B2* | 11/2020 | Hattori | B60W 30/0953 |
| 11,262,210 B2* | 3/2022 | Fujita | G09B 29/003 |
| 2010/0017407 A1* | 1/2010 | Beniyama | G06F 16/5854 |
| | | | 707/E17.016 |
| 2014/0072173 A1* | 3/2014 | Haas | G06T 7/74 |
| | | | 382/103 |
| 2016/0253806 A1 | 9/2016 | Iimura | |
| 2019/0001986 A1* | 1/2019 | Horita | B60W 40/04 |

FOREIGN PATENT DOCUMENTS

| | | |
|---|---|---|
| JP | 2016162013 A | 9/2016 |
| JP | 2017001638 A | 1/2017 |

OTHER PUBLICATIONS

International Search Report and Written Opinion of PCT/JP2019/002725 dated Mar. 19, 2019.

* cited by examiner

TRAIN POSITION ESTIMATION DEVICE

TECHNICAL FIELD

The present invention relates to a device that detects a position of a train.

BACKGROUND ART

Host vehicle position information is required for travel of a train based on a predetermined speed pattern. As a method of measuring a host vehicle position, a distance is calculated by integrating speeds measured by a speed sensor. It is difficult to prevent accumulation of integration errors occurred due to a deviation of a wheel diameter of a train. Track antennas that store positional information are therefore placed between rails. Positional information is retrieved when a train passes above each track antenna to correct the errors. This method is widely used.

On the other hand, the track antennas are placed between rails, and this requires installation cost and maintenance cost. Instead of this method, cameras and LiDAR (Light Detection and Ranging, Laser Imaging Detection and Ranging) are used to acquire current surroundings shape data. The current surroundings shape data is compared to surroundings shape data at each previously stored position to calculate a position. This is a developed map matching technique.

In general, when a position is calculated by the map matching, a load of matching processing is reduced by limiting a search range of a database around an estimated position acquired from different position measurement means such as GPS.

Patent Literature 1 discloses the invention that dynamically limits a search range of a database by using a feature of input sensor data. Patent Literature 1 describes that "a map reference area is set about a newest host position. Images similar to a current image is then searched for from images in the area on the map. The host position is estimated based on the distribution. This can improve the accuracy of host position estimation to reduce a processing load."

CITATION LIST

Patent Literature

Patent Literature 1
JP2016-162013A

SUMMARY OF INVENTION

Technical Problem

However, when the error of an estimated position is great, it is difficult to calculate a correct position. When a high volume of data having features exist on a database, the search range is unnecessarily expanded. This takes time for matching processing.

Solution to Problem

For addressing the above problem, a typical train position estimation device of the invention includes: a surroundings shape measurement unit installed to a vehicle traveling on a path to measure a surroundings shape at a current position of the vehicle and to then output data of the measured surroundings shape as measured surroundings shape data; and a map storage unit that stores control surroundings shape data that is data of a surroundings shape previously measured at each position. The train position estimation device compares the measured surroundings shape data to the control surroundings shape data to calculate a position of the vehicle. The train position estimation device includes: a start position estimation unit that stores a presence probability of a position of the vehicle; a map retrieval section determination device that outputs the control surroundings shape data at the position in descending order of the presence probability; and a matching processing device that compares the measured surroundings shape data to the control surroundings shape data outputted from the map retrieval section determination device to output a position where the difference is a predetermined threshold or less.

Advantageous Effects of Invention

According to the present invention, surroundings shape data of a position having a higher presence probability of a vehicle is preferentially retrieved when a position of the vehicle, e.g., on startup is calculated using a map matching technique. The retrieved surroundings shape data is then compared to current surroundings shape data. This can reduce the time required for the processing.

DESCRIPTION OF EMBODIMENTS

Hereafter, an embodiment is described with reference to a drawing.

First Embodiment

This embodiment describes a method in which a database used for map matching is retrieved in descending order of a vehicle presence probable position to reduce the time required for the matching.

Figure 1:
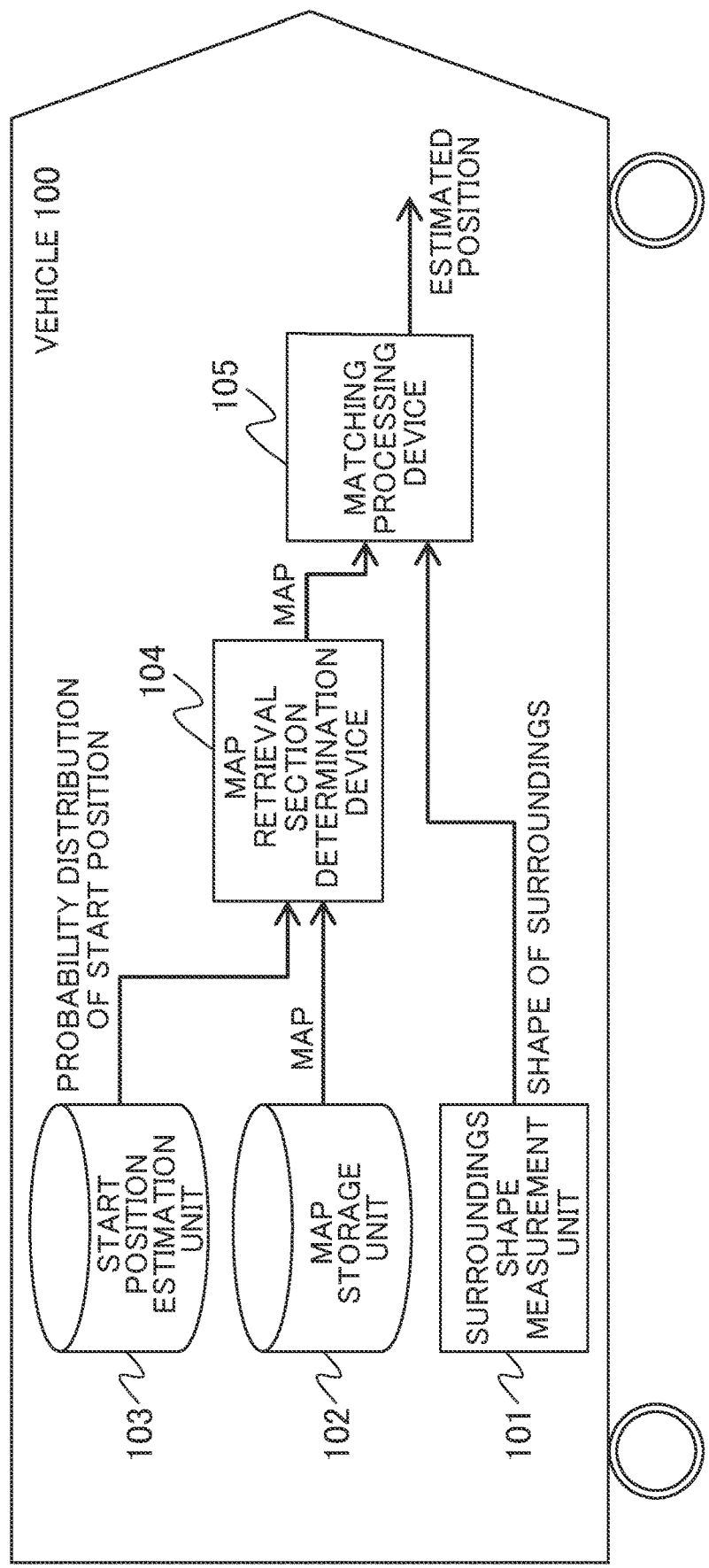
FIG. 1 is a block diagram showing an example of a configuration of a train position estimation device in First Embodiment.

First, a configuration and functions of components of a train position estimation device are explained using FIG. 1.

A vehicle 100 mounts a surroundings shape measurement unit 101 that measures a surroundings shape of a host vehicle. The surroundings shape measurement unit 101 is installed to widely measure the surroundings shape data of the vehicle. For example, the surroundings shape measurement unit 101 is installed to a front surface or upper portion of the vehicle.

The surroundings shape measurement unit 101 measures a surroundings shape around the vehicle at a current position as two dimensional or three dimensional coordinate information. A means to measure a surroundings shape includes LiDAR. The LiDAR emits a light beam in each direction and calculates a distance from the return time of the light beam reflected by an object to measure a current surroundings shape around the vehicle. The means to measure the current surroundings shape around the vehicle may include not only LiDAR but also a millimeter wave radar or a camera.

A map storage unit 102 retains and outputs surroundings shape data (map) at each position. The surroundings shape data at each position is acquirable when the surroundings shape measurement unit 101 etc. previously measures the surroundings shape data at each position. For example, SLAM (Simultaneous Localization and Mapping) may be used. This is a technique of creating surroundings shape data at each position from a travel distance calculated from a difference between the surroundings shape data at a position before travel and the surroundings shape data at a current position.

Figure 2:
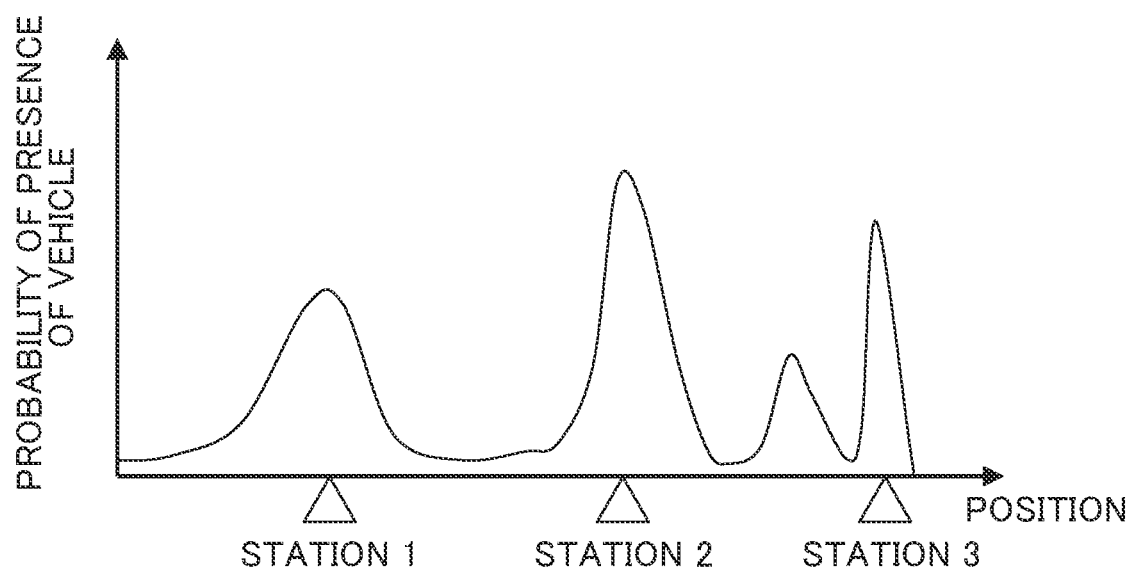
FIG. 2 is an example of a probability distribution stored in a start position estimation unit in First Embodiment.

A start position estimation unit 103 stores a probability distribution that is a distribution of the probabilities that the vehicle is present at each position on a railway. FIG. 2 illustrates an example of a probability distribution stored in the start position estimation unit 103. The probability distribution of presence of the vehicle at each position is calculated from a service planning diagram, trip plan, measured travel data, or vehicle stop information of a train. In general, the probability is high around stations and storage tracks. This probability distribution may be previously calculated. The start position estimation unit 103 may calculate the probability distribution (in real time or beforehand).

As an example, the probability distribution is calculated from the information about stop available stations and storage tracks and from whether a train is set to stop in a train service planning diagram.

At stop available stations or storage tracks where the train is set to stop in the train service planning diagram, the probability of train presence (hereinafter called a train presence probability at stop planned stations) is high. At stop available stations or storage tracks where no train is set to stop in the train service planning diagram, the probability of train presence (hereinafter called a train presence probability at stop unplanned stations) is lower than the train presence probability at stop planned stations. At stop unavailable stations or tracks other than storage tracks, the probability of train presence is lower than the train presence probability at stop planned stations and the train presence probability at stop unplanned stations.

When the same probabilities of train presence occur, a priority is set in order of a certain rule (for example, in order of proximity to a starting point). The same probabilities of train presence are compared in order of the priority.

The duration of train presence is calculated from measured travel data at each position on a path (for example, a station where a train can stop, a storage track, or a train shed). The percentage of stay of the train at each position may be then calculated within a day to acquire a presence probability of the train.

The map retrieval section determination device 104 outputs the map outputted from the map storage unit 102 to the matching processing device 105 in descending order of presence probability in position.

Figure 3:
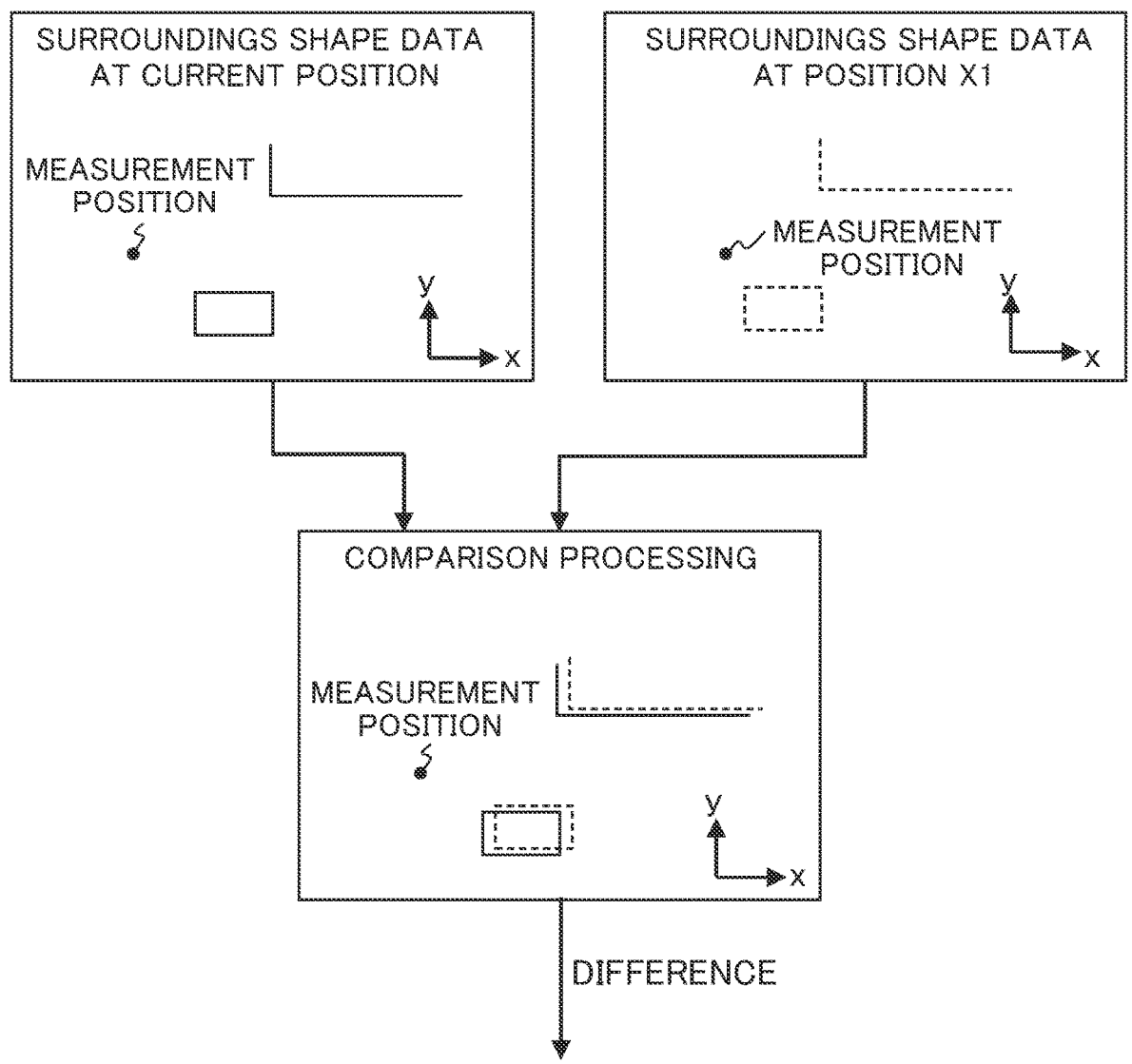
FIG. 3 is an example of comparison using a matching processing device in First Embodiment.

The matching processing device 105 compares the surroundings shape data of a current position outputted from the surroundings shape measurement unit 101 to the surroundings shape data at each position outputted from the map retrieval section determination device 104 to calculate a difference. FIG. 3 illustrates an example of the comparison in the matching processing device 105. The surroundings shape data of a current position outputted from the surroundings shape measurement unit 101 is compared to the surroundings shape data outputted from the map retrieval section determination device 104 to calculate a difference. When the difference is less than a predetermined threshold, the position is outputted as an estimated position.

As a method of calculating a difference, a map space is divided into grids each having a specific size to calculate a match rate or mismatch rate at each grid. This is NDT (Normal Distributions Transform). FIG. 3 explains the example of matching of two-dimensional surroundings shape data. This embodiment is not limited to measurement of two dimensional surroundings shape data. This embodiment is also applicable to matching of three dimensional surroundings shape data.

As above, the configuration of the train position estimation device and the function of each component are explained.

Figure 4:
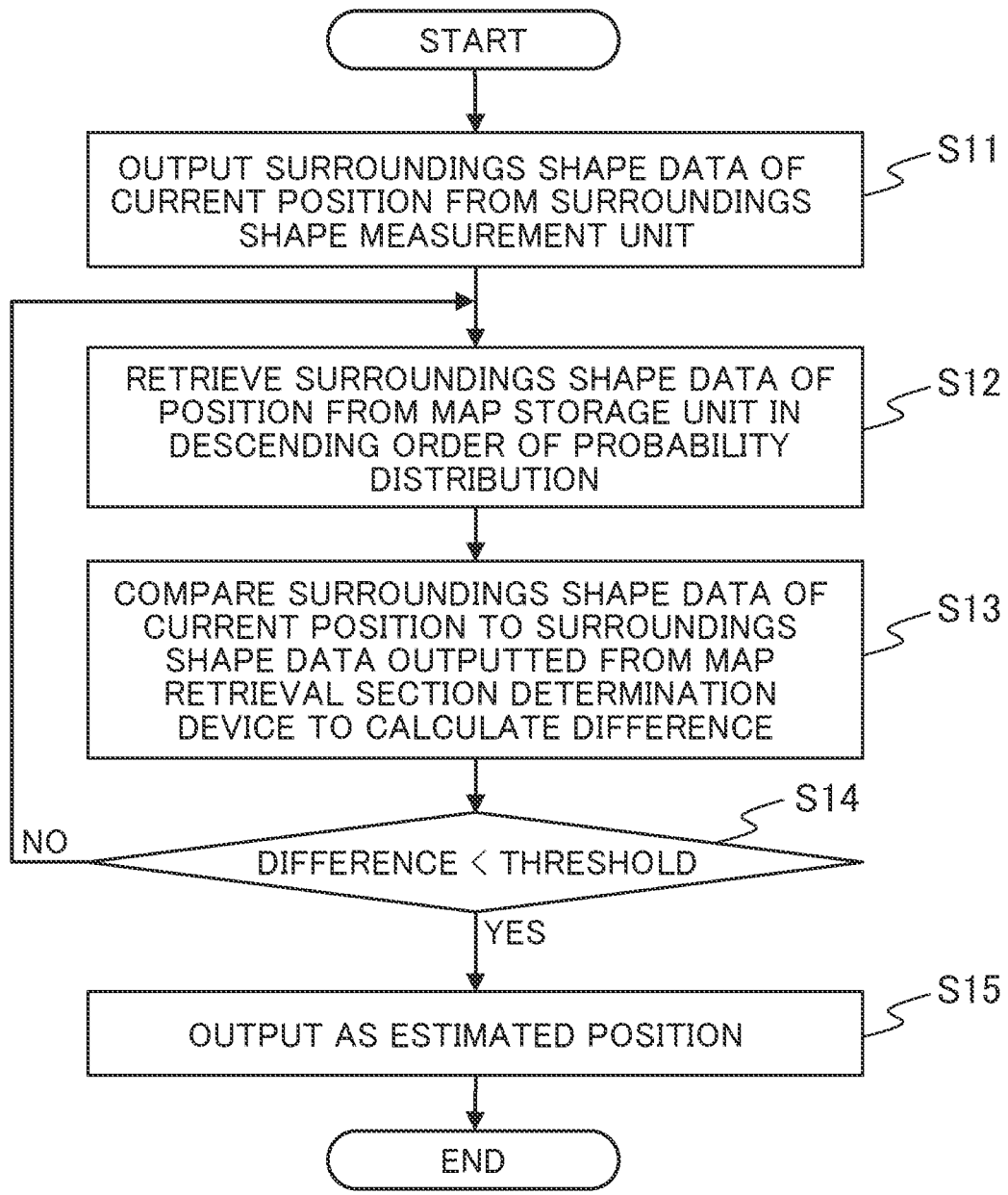
FIG. 4 is a flowchart showing an example of a procedure of position estimation in First Embodiment.

Next, an example of a procedure of position estimation in this embodiment is explained using a flowchart of FIG. 4.

This processing is executed when the vehicle 100 is activated. This is not limiting. The processing may be executed as needed.

At Step S11, surroundings shape data of a current position is outputted from the surroundings shape measurement unit 101.

At Step S12, the map retrieval section determination device 104 retrieves surroundings shape data from the map storage unit 102 in descending order of probability distribution in position based on the probability distribution data from the start position estimation unit 103.

At Step S13, the matching processing device 105 compares the surroundings shape data of the current position to the surroundings shape data outputted from the map retrieval section determination device 104 to calculate a difference.

At Step S14, the difference is compared to a predetermined threshold. When the difference is less than the threshold, the flow proceeds to Step S15. When the difference is more than the threshold, the flow returns to Step S12 to retrieve a next ordered map.

At Step S15, the position determined at Step S14 is outputted as an estimated position.

The above is an explanation of the processing flow of the train position estimation device.

As above, according to this embodiment, when a position on startup of a vehicle is calculated using the map matching technique, the surroundings shape data of a position having a higher vehicle presence probability distribution is preferentially retrieved. The retrieved surroundings shape data is compared to the current surroundings shape data to reduce the time required for the calculation.

The procedure of position estimation of this embodiment may be made as needed, e.g., not only when the vehicle is started but also when the vehicle loses or updates information about the current position.

For example, the start position estimation unit 103 may store the position where the vehicle loses information about the current position in the past, calculate a probability of losing information about the current position at each position, and output the probabilities as a probability distribution that is a distribution of probabilities of vehicle presence on a railway at the respective positions.

This can reduce the time required to again calculate the current position when the vehicle loses the information about the current position.

The start position estimation unit 103 may separately store "the presence probability of a vehicle on startup" and "the presence probability of a vehicle on position loss (probability of position loss)." In this case, the map retrieval section determination device 104 selects "the presence probability of a vehicle on startup" in the map matching on startup. The map retrieval section determination device 104 then outputs control surroundings shape data in descending order of "presence probability of a vehicle on startup." The map retrieval section determination device 104 selects "the presence probability of a vehicle on position loss (probability of position loss)" in the map matching on position loss. The map retrieval section determination device 104 then outputs control surroundings shape data in descending order of "the presence probability of a vehicle on position loss (probability of position loss)." The presence probability used on startup or position loss is appropriately switchable in such processing. This can reduce the time required for the map matching.

The map retrieval section determination device 104 may include position detecting means using GPS, determine a detection error of GPS, and determine whether the detection error is more than a predetermined amount (or whether the detection is impossible). In this case, the map retrieval section determination device 104 outputs control surroundings data in descending order of the presence probability outputted from the start position estimation unit 103 when the detection error of GPS is more than the predetermined amount (or when the detection is impossible). In another case (when the detecting accuracy of GPS is reliable), the map retrieval section determination device 104 outputs control surroundings shape data in order of proximity to the position detected by the position detecting means using GPS. Even when the detection error of GPS is great (or when the detection is impossible), the time required for the map matching can be reduced.

The present invention is not limited to the above embodiment. Various modifications are possible. For example, the embodiment is described in detail to clearly explain the present invention. The present invention is not limited to an embodiment including all the explained components. It is possible to replace part of a configuration of a certain embodiment with a configuration of another embodiment. It is also possible to add a configuration of another embodiment to a configuration of a certain embodiment.

LIST OF REFERENCE SIGNS

100 vehicle
101 surroundings shape measurement unit
102 map storage unit
103 start position estimation unit
104 map retrieval section determination device
105 matching processing device

The invention claimed is:

1. A train position estimation device comprising:
a surroundings shape measurement unit installed to a vehicle traveling on a path and configured to measure a surroundings shape at a current position of the vehicle and output data of the measured surroundings shape as measured surroundings shape data; and
a map storage unit configured to store control surroundings shape data that is data of a surroundings shape at each position measured in advance,
wherein the measured surroundings shape data is compared to the control surroundings shape data to calculate a position of the vehicle,
the train position estimation device comprising:
a start position estimation unit configured to store a presence probability at each position where the vehicle may be present;
a map retrieval section determination device configured to output the control surroundings shape data at the position in descending order of the presence probability; and
a matching processing device configured to compare the measured surroundings shape data to the control surroundings shape data outputted from the map retrieval section determination device to output a position at which the difference is a predetermined threshold or less,
wherein the start position estimation unit is configured to store a probability of position loss at a position where positional information is lost in a past to acquire the presence probability based on the probability of position loss.

2. The train position estimation device according to claim 1 wherein
the surroundings shape measurement unit is further configured to emit a laser light to an object to measure a surroundings shape by measuring a distance to the object from a return time of the reflected light.

3. The train position estimation device according to claim 1 wherein
the map storage unit is configured to store data of the surroundings shape previously measured by the surroundings shape measurement unit at each position.

4. The train position estimation device according to claim 1 wherein
the start position estimation unit is configured to calculate the presence probability from a service planning diagram, a trip plan, travel data, or stop information of the vehicle.

\* \* \* \* \*